United States Patent Office 3,647,883
Patented Mar. 7, 1972

3,647,883
OLEFIN DIMERIZATION
Michael Dubeck, Birmingham, and David R. Brackenridge, Royal Oak, Mich., assignors to Ethyl Corporation, New York, N.Y.
No Drawing. Filed July 30, 1969, Ser. No. 846,224
Int. Cl. C07c 3/10
U.S. Cl. 260—683.15 D
14 Claims

ABSTRACT OF THE DISCLOSURE

A process for dimerizing olefins by contacting $C_{2-18}$ olefins with a catalyst system comprising nickel chelate and trihydrocarbyl boron compounds; for example, bis (2,4-pentanedionato) nickel and triethylboron, at temperatures from 100° to 200° C. and optionally in the presence of a non-polar solvent.

BACKGROUND OF THE INVENTION

Field of the invention

This invention relates to the production of long-chain olefins from short-chain olefins. More particularly, the invention relates to the dimerization of $C_2$–$C_{18}$ olefins to produce $C_4$ to $C_{36}$ olefins. Moreover, the invention relates to a catalytic process in which the starting olefins are contacted with a catalyst system to produce the olefin dimers desired.

Prior art

The dimerization of olefins is described in several patents in the prior art. Many catalyst systems have been disclosed for the purpose of producing olefin dimers. The aluminum alkyls are well known as olefin dimerization catalysts and as co-catalysts in connection with other materials for dimerizing olefins. For example, U.S. 3,004,087 describes the aluminum trialkyl and finely divided nickel catalyst system for dimerization of butene-2. Also U.S. 3,009,972 provides the aluminum alkylborane catalyst system for dimerization of internal and terminal olefins. Such catalyst systems all require the use of aluminum alkyls, either alone or in combination with a co-catalyst. Not only have such catalysts been used in olefin dimerization processes, but they find particularly good use in polymerization reactions. For example, U.S. 3,160,672 shows ethylene polymerization with alkyl aluminum and alkyl boron. In addition, U.S. 2,840,551 shows the polymerization of olefins with a nickel-boron catalyst system, but obtains only high molecular weight solid polymers.

Many prior art processes produce dimerization products which contain a high degree of branched olefins. Moreover, many prior art processes are characterized by relatively low yields. Thus, a significant need exists for a process to produce substantially linear olefin dimers at high yield.

SUMMARY OF THE INVENTION

An object of this invention is the production of substantially linear olefin dimers. Another object is the production of dimers using a low catalyst-to-product weight ratio. Still another object is production of linear dimers in relatively short reaction times and with substantially higher yields than prior art processes.

These and other objects are accomplished by providing a process for producing olefin dimers, said process comprising contacting monoethylenically unsaturated olefins with a catalytic amount of a catalyst system consisting essentially of a nickel chelate and a trihydrocarbylboron selected from trialkylborons in which the alkyl radicals contain from 1–12 carbon atoms and triaryl borons in which the aryl radicals are mononuclear radicals containing from 6–12 carbon atoms, said process being carried out at a temperature of from about 100° to about 200° C.

DESCRIPTION OF PREFERRED EMBODIMENTS

The olefins used as starting materials for the process of this invention are monoethylenically unsaturated, and thus, have only one double bond in the carbon chain. The monomeric olefins suitable for producing the olefin dimers are those olefins having from 2 to 18 carbon atoms in the carbon chain. Thus, acyclic materials such as ethylene, propylene, butene, pentene, hexene, heptene, octene, and nonene, decene, undecene, dodecene, tridecene, tetradecene, pentadecene, hexadecene, heptadecene, and octadecene, are all suitable olefins for use in the process of this invention. Particularly suitable olefins are solely composed of carbon and hydrogen and have alpha unsaturation. Thus, the terminal olefins, for example, ethylene, propene, butene-1, pentene-1, hexene-1, heptene-1, octene-1, and nonene-1, are preferred olefins. While branched chain olefins are also suitable for dimerizing in the process of this invention, the branched olefin dimers are not as desirable for further processing in some industries using dimers.

The higher α-olefins are also within the scope of the term olefins as used in this process. Thus, the olefins having a carbon chain length greater than 9 are suitable olefins for this invention. Process conditions may require variation when dimerizing higher α-olefins; for example, higher temperatures and/or longer reaction times may be required.

The catalyst system required to produce olefin dimers according to the process of this invention contains a nickel chelate and a trihydrocarbyl boron. (By "hydrocarbyl" we mean a radical solely composed of carbon and hydrogen.) A chelate compound is generally a combination of a metal with two or more electron-donating groups which are capable of forming a ring structure. Suitable nickel chelates used in the process of this invention are nickel chelates prepared from difunctional organic compounds selected from the group consisting of (a) Dicarbonyl compounds of the formula

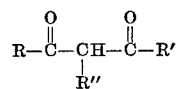

wherein R, R' and R" are independently selected from the group consisting of hydrogen, alkyl radicals having from 1–12 carbon atoms and halogenated derivatives thereof, aryl radicals having 6 to 12 carbon atoms, alkaryl radicals having from 7 to 20 carbon atoms, and aralkyl radicals having from 7 to 20 carbon atoms;

(b) Hydroxy carbonyl compounds having the formula

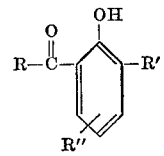

wherein R, R' and R" are as described above;

(c) Carbonyl amine compounds having the formula

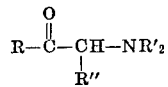

wherein R, R' and R" are as described above;

(d) Glyoxime compounds having the formula

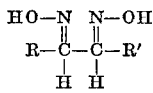

wherein R and R′ are as described above;

(e) Organic disulfide compounds having the general formula $$R-S-CH_2-CH_2-S-R'$$

wherein R, and R′ are as described above; and (f) Hydroxyl amine compounds having the general formula

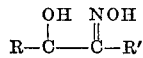

wherein R and R′ are as described above.

Examples of dicarbonyl-containing nickel chelates are nickel diketone and nickel ketoaldehyde. The preferred nickel chelates are the diketones. Examples of the useful nickel carbonyl chelates are given in the general formula:

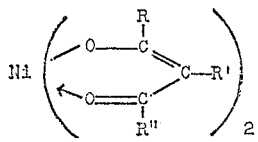

wherein R, R′ and R″ are as described above. Exemplary diketone nickel chelates described by the above formula which are useful in this process are bis(2,4-hexanedionato)nickel, bis(2,4 - octanedionato)nickel, bis(5,5,5-trichloro - 2,4 - pentanedionato)nickel, bis(1,1,1,5,5,5-hexafluoro - 2,4-pentanedionato)nickel, bis[1,3-di(p-methoxyphenyl) - 1,3 - propanedionato]nickel, and bis(1,3-di-p-chlorophenyl-1,3-propanedionato)nickel. Most preferred diketonickel chelates are bis(2,4-pentanedionato)nickel, bis(1,3-diphenyl-1,3-propanedionato)nickel, and bis[4,4,4-trifluoro-1-(2-thienyl)-1,3-butanedionato]nickel.

Examples of aldehyde-containing nickel chelates are bis(salicylaldehydato)nickel, bis(salicylaldehydemethylamino)nickel, bis(salicylaldeoximo)nickel, and bis(salicylaldeanil)nickel. A most preferred aldehyde nickel chelate compound is bis(salicylaldehydato)nickel.

Examples of nitrogen-containing nickel chelates are the diamines, oximes, glyoximes, and pyridines. For example, bis(dimethylglyoxime)nickel, bis(methylbenzylglyoximo)nickel, bis(methyl-n-butylglyoximo)nickel, bis(salicylaldehydeoximo)nickel, tris(ethylenediamine)nickel, and tris($\alpha,\alpha'$-dipyridinyl)nickel.

In addition, many of the preferred carbonyl-containing nickel chelates are prepared in amine solutions. For example, bis(2,4-pentanedionato)nickel is often prepared as the diamine thereof. Thus, the suitable nickel chelates may contain amine groups as well as carbonyl groups or mixtures of these.

The trihydrocarbyl boron compound may generally be described as any borane compound which is compatible with the nickel chelate. Usually, alkyl, aryl, or mixtures of alkyl and aryl boron catalyst compounds are suitable boron catalyst components. The trihydrocarbyl boron compounds selected from trialkyl borons in which the trialkyl radical contains from 1–12 carbon atoms and the triaryl borons in which the aryl radicals are mononuclear radicals containing from 6–12 carbon atoms are preferred trihydrocarbyl borons. Examples of suitable trialkyl boron compounds are those having the formula $RR^1R^2B$ wherein R, $R^1$ and $R^2$ are independently selected from alkyl radicals of 1 to 12 carbon atoms. Preferably, all three radicals are identical and such compounds are exemplified by the following illustrative examples: trimethylboron, triethylboron, tri-n-butylboron, tri-t-butylboron, trihexylboron, trioctylboron, trinonylboron, tridecylboron, and tridodecylboron. In addition to the foregoing linear alkyl radicals, branched alkyl radicals are also suitable for the boron component of the catalyst. Thus, 2-methylpentyl, 2-ethylhexyl, t-butyloctyl, and 2-ethyldecyl are typical branched alkyl radicals suitable for the alkyl borons of this catalyst system. The linear alkyl radicals are preferred. A most preferred alkyl boron is triethylboron.

Typical aryl boron compounds are unsubstituted or alkyl-substituted mononuclear boron compounds. For example, tolyl, ethylbenzyl, propylbenzyl, t-butylphenyl, hexylphenyl, and xylyl, o-methyl-p-butylphenyl, and so forth, are typical of the alkyl-substituted aryl radicals suitable for the boron component of this catalyst system. The aryl radicals may be alike or different. The unsubstituted aryl radicals are preferred. A most preferred aryl boron compound is triphenylboron.

The mechanism of this catalytic dimerization is not fully understood and this process is not limited by the mechanism proposed. It is thought that the nickel chelate and trihydrocarbyl boron interact to form a catalytic species which itself causes dimerization of the olefin. Thus, any manner of addition of the olefin, nickel chelate and trihydrocarbyl boron which is convenient and practical is suitable if compatible with the reaction system.

The catalyst system suitable for use in the process of producing olefin dimers is present in the reaction vessel in a catalytic amount. The amount present is not critical. It should be sufficient to promote rapid reaction, but not enough to make the reaction mixture viscous and difficult to handle. Typically, a range of from 1 to 4 parts by weight of catalyst based on the weight of nickel chelate per 100 parts of olefin is suitable for the process of this invention. A preferred amount of catalyst is 2 parts by weight of catalyst based on nickel chelate per 100 parts of olefin. The amount of catalyst which gives high molar ratios of olefin dimer to catalyst is most practical and this should govern the amount of catalyst used. The amount of trihydrocarbyl boron compound used is based on the nickel chelate, expressed as the boron-to-nickel ratio. A molar ratio ranging from 1:1 to 1:10 moles of trihydrocarbyl boron compound to nickel chelate compound is preferred. A most preferred range of ratio of trihydrocarbylboron to nickel chelate is from 1:2 to about 1:5.

The process is carried out at a temperature to produce the olefin dimers desired. A preferred temperature range for contacting the olefin with the catalyst system is from about 100° to about 200° C. A most preferred temperature range is from 125° to about 175° C.

The process for producing the olefin dimers may be carried out without a solvent present. However, a preferred process includes the use of a solvent in which the olefin contacts the catalyst system. Typical solvents used in the above process are heptane, decane, benzene, toluene, p-dioxane, diglyme, tetrahydrofuran, an excess of the starting olefin, and the like. A most preferred solvent, when a solvent is used, is benzene.

The following examples illustrate the process of this invention. Unless otherwise indicated, all parts are by weight.

EXAMPLE 1

The nickel component of a catalyst system was prepared in the following manner. Concentrated ammonium hydroxide, 300 parts, was added to a solution of nickel nitrate hexahydrate, 100 parts, (in $H_2O$, 625 parts) and stirred for five minutes. Then a solution of acetylacetone (69.1 parts) in 100 parts dioxane was added and the mixture stirred for about ten minutes. The precipitate formed was filtered under vacuum and washed with water. After preliminary drying the product was heated for a total of 30 hours at 125°–135° C.; the blue precipitate was converted to a light green powder. The chelate (86.3 percent yield) was collected, bottled and stored in a desiccator. From elemental analysis, the following percentages were determined: C, 46.2; H, 5.62; Ni, 22.2; N, 0.35. Calculated: C, 46.7; H, 5.49; Ni, 22.8; N, 0.

EXAMPLE 2

The following reactants were charged to a pressure reaction vessel: 15.2 parts of triethylboron in 1700 parts of benzene; 1000 parts of hexene-1, and finally, 20 parts of bis-(2,4-pentanedionato)nickel (as prepared in Example 1). The reaction vessel was sealed and pressured to about 100 p.s.i.g., with nitrogen. After heating at 150° C. for about three hours, the vessel was cooled and a sample from the liquid phase of the reaction mixture showed (by gas chromatography) that $C_{12}$ olefin was prepared in a yield of 24.5 percent. This indicates a molar ratio of dimer formed to catalyst, based on the nickel chelate, of 18.7:1. (Hydrogenation and gas chromatography analysis show dimer linearity to be about 75 percent.)

Similar results are obtained using as the olefin, butene-1, ethylene and dodecene-1. Other typical solvents which may be used with similar results are toluene, dioxane and diglyme. In many instances, it is advantageous to include a paraffin of carbon chain length similar to the olefin dimer to be produced as an internal standard for convenient analysis.

EXAMPLE 3

The procedure of Example 2 was followed except that no solvent was added with the reaction mixture. A 13.9 percent yield of $C_{12}$ olefin dimer (75 percent linear) was obtained after three hours reaction at 150° C. The molar ratio of dimer to nickel catalyst was 10.6:1.

Similarly, for example, octene-1, decene-1, dodecene-1, hexadecene-1 and octadecene-1 may be dimerized without use of a solvent.

EXAMPLE 4

The procedure of Example 2 is repeated except that triphenylboron is used as the boron portion of the catalyst in an amount sufficient to yield at 2:1 ratio of boron-to-nickel. Dodecene dimer is produced after heating at 150° C. for 3 hours.

Similar results may be obtained when triphenylboron is used as the boron component of the catalyst system in dimerizing ethylene, butene-1, nonene-1, dodecene-1, undecene-1 and octadecene-1. Typical solvents for use with triphenylboron in the reaction system are heptane, benzene, o-xylene and nonane.

EXAMPLE 5

The procedure of Example 2 was repeated using 9.2 parts of butene-1 and a molar ratio of triethylboron to nickel catalyst of 2:1 with 10 parts of benzene solvent. After 23 hours at 150° C., the yield of $C_8$ olefin was 45.4 percent. The molar ratio of product dimer to catalyst was 25.2:1 and the octene product showed a linearity of 79.4 percent.

EXAMPLE 6

The procedure of Example 2 was repeated using bis-(salicylaldehydato)nickel with triethylboron (in a molar ratio of boron to nickel of 2:1) and 8.4 parts of butene-1. In this example, 1.4 parts of nonane was added as an internal standard. After 23 hours at 150° C., a 5.72 percent yield of $C_8$ olefin dimer was found. The molar ratio of product dimer to catalyst was 2.94:1 and the $C_8$ olefin product was 84.7 percent linear.

Similar results are obtained using tributylboron or triphenylboron in either benzene or heptane solvents. Typical olefins which may be dimerized using the catalyst of Example 6 are hexene-1, octene-1, dodecene-1, and the like.

EXAMPLE 7

To a reaction vessel was added 3.86 parts of triethylboron in 170 parts of benzene solvent. Hexene-1, 100 parts, was then placed in the reaction vessel. As an internal standard for later gas chromatograph analysis, 12.45 parts of n-decane were added to the reaction mixture. Finally, 2 parts of bis(1,1-dibenzoylmethane)nickel were added to the reaction vessel, thus giving a boron-to-nickel catalyst ratio of about 10:1. The reaction vessel was sealed and pressured with nitrogen to about 90 p.s.i. After heating for three hours at 150° C., the reaction vessel was cooled and opened. A sample of the product was shown by analysis to contain a $C_{12}$ olefin with 24.1 percent yield. The molar ratio of product olefin dimer to nickel catalyst was 36.2:1.

Similar results may be obtained by using a triphenylboron or tri-n-butylboron catalyst. Typical olefins which may be dimerized with the catalyst system of Example 7 are ethylene, butene-1, heptene-1, decene-1, dodecene-1, hexadecene-1, octadecene-1, and the like.

EXAMPLE 8

The procedure of Example 7 was followed except that the nickel catalyst is bis[4,4,4-trifluoro-1(2-thienyl)-1,3-butanedionato]nickel added at a catalyst ratio of 2.15:1.0 of triethylboron to nickel. Butene-1, 9.1 parts, was added as the starting olefin. After 23 hours at 150° C., the yield of $C_8$ olefin dimer was 11.7 percent with a molar ratio of olefin dimer product to catalyst of 11.7:1.0.

Similar results are obtained by dimerizing hexene-1, octene-1, dodecene-1, and the like, with the catalyst of Example 8. In addition, the catalyst system may use triphenylboron, tri-n-butylboron, or the like, as the boron component thereof.

EXAMPLE 9

To a reaction vessel is added bis(1,3-diphenyl-1,3-propanedionato)nickel and triethylboron to form a molar catalyst ratio of 2.25:1 of the boron-to-nickel. The catalyst is admixed with 1000 parts of benzene. Ten parts of hexene-1 are then added and the reaction vessel sealed. After heating for 23 hours at 100° C., the vessel is opened and the product analyzed by gas chromatography. $C_{12}$ olefin is produced.

Similar results may be obtained on using tri-n-butylboron or triphenylboron (with a benzene solvent) as the boron component of the catalyst system. Typical starting olefins for use in the process of Example 9 are ethylene, butene-1, octene-1, decene-1, tetradecene-1, hexadecene-1, and the like.

EXAMPLE 10

The following reactants are added to a reaction vessel: 2 parts of bis(2,4-hexanedionato)nickel; 10 parts by volume of triethylboron in 200 parts of benzene; and 100 parts of butene-1. The reaction vessel is flushed with nitrogen, sealed, and pressured to 100 p.s.i.g. with nitrogen. The reaction vessel is then heated to 200° C. and the reaction allowed to continue for three hours. $C_8$ olefin is produced.

Similar results are obtained using the process of Example 10 when the boron component of the catalyst system is tri-n-butylboron or triphenylboron. Also, the system may be reacted in the presence of excess olefin in lieu of using a separate solvent. Typical olefins which may be dimerized by the catalyst system of Example 10 are ethylene, hexene-1, decene-1, dodecene-1, tetradecene-1, octadecene-1, and the like.

The following examples illustrate the need for using a catalyst system which includes both the nickel and boron components.

EXAMPLE 11

To the reaction vessel was added 2 parts by volume of triethylboron in 200 parts of benzene solvent. Then 100 parts of butene-1 were added and the reaction vessel sealed. After heating to 150° C. for 18 hours, the reaction vessel was opened and a sample analyzed by gas chromatography. No $C_8$ olefin was found.

EXAMPLE 12

A reaction vessel was charged with 1.6 parts of bis(2,4-pentanedionato)nickel in 170 parts of benzene solvent. The vessel was then charged with 100 parts of hexene-1 and 5 parts of n-undecane was added as an internal standard for later analysis. The vessel was sealed and heated to 150° C. for five hours. After cooling, a sample of the reaction mixture failed to show any $C_{12}$ olefin dimer product on analysis by gas chromatography.

The above examples clearly illustrate the necessity for both the nickel and boron components of the catalyst system. While the organic ligands may be changed, the effect will largely be found on linearity and yield.

The olefin dimers produced by the process of this invention are useful as detergent and plasticizer intermediates. For instance, the $C_{12}$ olefin may be sulfonated to produce detergent materials. They are also useful as oxo starting materials from which aldehydes and acids may be formed. These latter have a multitude of well-known uses, including intermediates for lubricants and lubricant additives. Further, the olefin dimer products may be further dimerized to yield long-chain internal olefins which are useful in the production of waxes, polishes, and fatty alcohols.

We claim:
1. A process for producing an olefin dimer, said process comprising contacting a monoethylenically unsaturated olefin with a catalytic amount of a catalyst system consisting essentially of a nickel chelate and a trihydrocarbyl boron selected from trialkylborons in which the alkyl radicals contain from 1 to 12 carbon atoms and triaryl borons in which the aryl radicals are mononuclear aryl radicals containing from 6 to 12 carbon atoms, said process being carried out at a temperature of from about 100° to about 200° C.

2. A process of claim 1 wherein said nickel chelate compound is selected from the group consisting of bis(2,4-pentanedionato)nickel, bis(1,3-diphenyl-1,3-propanedionato)nickel, bis(salicylaldehydato)nickel, and bis[4,4,4-trifluoro-1-(thienyl)-1,3-butanedionato]nickel.

3. A process of claim 2 wherein said nickel chelate compound is bis(2,4-pentanedionato)nickel.

4. A process of claim 1 wherein said trihydrocarbyl compound is a trialkyl boron.

5. A process of claim 4 wherein the organic portion of said trialkyl boron is selected from the group consisting of ethyl radicals, butyl radicals, and mixtures thereof.

6. A process of claim 5 wherein said organoboron compound is triethyl boron.

7. A process of claim 6 wherein said nickel chelate is bis(2,4-pentanedionato)nickel.

8. A process of claim 1 wherein said olefins are terminal olefins having from 3 to 18 carbon atoms.

9. A process of claim 8 wherein said olefin is selected from the group consisting of butene-1 and hexane-1.

10. A process of claim 9 wherein said nickel chelate is bis(1,3-diphenyl-1,3-propanedionato)nickel, said trihydrocarbyl boron is triethylboron, said catalyst system having a molar ratio of said nickel chelate to said trihydrocarbylboron of from 10:1 to about 1:1, said process being carried out at a temperature of from about 125° to about 175° C. in the presence of a solvent.

11. A process of claim 10 wherein said solvent is benzene.

12. A process of claim 2 wherein said nickel chelate compound is bis(1,3-diphenyl-1,3-propanedionato)nickel.

13. A process of claim 2 wherein said nickel chelate compound is bis(salicyladehydato) nickel.

14. A process of claim 2 wherein said nickel chelate compound is bis[4,4,4-trifluoro - 1 - (thienyl)-1,3-butanedionato]nickel.

References Cited
UNITED STATES PATENTS

| | | | |
|---|---|---|---|
| 3,235,613 | 2/1966 | Lapporte | 260—666 |
| 3,303,239 | 2/1967 | Cleary et al. | 260—683.15 |
| 3,483,268 | 12/1969 | Hambling et al. | 260—683.15 |

PAUL M. COUGHLAN, JR., Primary Examiner

U.S. Cl. X.R.

252—431 R, 431 N